(12) United States Patent
Condello et al.

(10) Patent No.: US 8,203,737 B2
(45) Date of Patent: Jun. 19, 2012

(54) METHOD AND SYSTEM FOR SET-POINT SHARING AND PURCHASING

(75) Inventors: Anthony Salvatore Condello, Webster, NY (US); Augusto Barton, Webster, NY (US); David J. Gervasi, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 834 days.

(21) Appl. No.: 12/273,078

(22) Filed: Nov. 18, 2008

(65) Prior Publication Data

US 2010/0123922 A1    May 20, 2010

(51) Int. Cl.
*G06F 15/00* (2006.01)
*G03G 15/01* (2006.01)

(52) U.S. Cl. .......................................... 358/1.15; 399/45
(58) Field of Classification Search .................. 358/1.15, 358/1.9; 399/45, 156, 182; 382/115; 156/264, 156/260
See application file for complete search history.

(56) References Cited

U.S. PATENT DOCUMENTS

| | | | |
|---|---|---|---|
| 6,940,613 B1 | 9/2005 | Beard et al. | |
| 6,965,462 B1 | 11/2005 | Henderson et al. | |
| 7,861,172 B1 * | 12/2010 | Minagawa | 715/735 |
| 2008/0079966 A1 * | 4/2008 | Thomas | 358/1.9 |
| 2008/0253783 A1 * | 10/2008 | Kuo et al. | 399/45 |

FOREIGN PATENT DOCUMENTS

EP            2 187 305 A2    5/2010

* cited by examiner

*Primary Examiner* — Saeid Ebrahimi Dehkordy
(74) *Attorney, Agent, or Firm* — MH2 Technology Law Group LLP

(57) ABSTRACT

A method and a system for operating one or more printers, including: a first database for managing and storing first content within the system; a second database for managing and storing second content within the system; and at least one network connection for connecting the first database and the second database for allowing the first content and the second content to be shared between the first database and the second database; wherein at least one of the first content or the second content include at least one or more printer profiles.

20 Claims, 2 Drawing Sheets

METHOD AND SYSTEM FOR SET-POINT SHARING AND PURCHASING

BACKGROUND

The present disclosure relates to electronic printer output devices, and more particularly, to a method and a system for purchasing and/or sharing one or more pre-developed or pre-existing printer profile settings.

An electronic printer output device ("printing device") is generally capable of producing color and standard black-and-white tones to produce images. The printing device accepts color level specifications (typically for each of four colors including cyan, magenta, yellow, and black ("CMYK")) as input and produces corresponding color areas on a printed page. However, the printing device may also be MICR (magnetic ink character recognition) compatible, bar code reading compatible, and/or optical character recognition compatible. The printing device may be compatible with any type of character recognition technology.

In addition, a printing device is designed to operate under certain conditions. More specifically, a printing device is calibrated to operate at an ideal set-point, for producing relatively consistent output when used within an environment having specific desired operating parameters such as, for example, a specific humidity, temperature, altitude, and dust count, etc. If any of the operating parameters deviates from the desired operating parameter, the printing device may drift away from the ideal set-point.

As a result, print engines may vary subsystem set-points as a function of media, image content, job mix, ambient (T/RH) conditions, etc. in order to maintain an ideal set-point for each parameter. One purpose of a subsystem is to operate within a range that accommodates the unique demands of a particular job while enabling improved image quality, reliability, and/or life. For instance, when running heavy weight media the fusing process speed may be slowed and/or the fusing temperature increased. Thus, many subsystems (e.g., fusing, development, feeding, decurling, finishing, etc.) could benefit from using one or more pre-developed or pre-existing printer profile settings for each individual job.

Print engines include specially-adapted memory devices, herein called "customer replaceable unit monitors," or CRUMs as referred to by individuals associated with or doing business with Xerox®. The CRUMs are associated with one or more customer-replaceable modules within the apparatus. As is known in the copier or printer industry, consumers can buy or lease individual modules as needed, and typically replace the modules without any special training. The overall purpose of each CRUM is to retain information for the particular module about how that module is being used within a machine. Each CRUM can be considered a small "notepad" on which certain key data is entered and retained, and also periodically updated. Different types of data can be stored in a CRUM, such as, set point data used in conjunction with one or more pre-developed or pre-existing printer profile settings. The one or more pre-developed or pre-existing printer profiles may be included in a CRUM. However, the one or more pre-developed or pre-existing printer profiles may be compatible with machines that do not include a CRUM. The one or more pre-developed or pre-existing printer profiles may co-exist and function with any machine or device having any type of a plurality of memory devices.

The CRUM can have loaded at certain predetermined locations in the memory therein, numbers or other codes which directly relate to specific operating requirements of various components within one or more modules. Any or all of the various components to be biased may be biased according to a specific function which may relate to one or more external variables such as, for example, temperature, humidity, altitude, and current toner level in the development unit. Thus, there can be stored at predetermined locations within the memory of a CRUM "set point codes" (either absolute numbers, or special codes which relate to absolute numbers) of how much each individual component within the one or more modules should be biased by the machine. Alternately, the set point codes could indicate one of a selectable set of functions, such as look-up tables, which represent functions by which the desired bias of different components should be calculated. In addition, different sets of set points can be stored in different predetermined locations in memory, and the machine can access those addresses in memory depending on whether the machine is rated at one speed or capability or the other. In this way, a module of a single basic design can be installed and function in a compatible manner in machines rated at different speeds.

In addition, there exists a wide and ever expanding range of desired media to be used in today's high quality/high volume printers. Fusing and xerographic settings can vary greatly depending on whether the substrate is tissue paper or cardboard. Presently, most machines categorize media into large scale buckets where minimum quality is guaranteed but may be far from that desired. Adjusting parameter values could be described as "optimizing," which typically means to improve image quality, reliability and/or component life, or make custom adjustments of images in specific media (e.g., gloss). Variables that could be adjusted in the fuser may include temperature, process speed, roll loading, oil rates, stripping, cleaning, altitude, etc.

Currently, an automated parameter process has not been established. Moreover, a manual parameter process has also not been established since it could take hours/days to evaluate prints and even longer to establish life data. The present disclosure is not intended to specify the method by which the desirable adjustment of parameters is found but rather to promote the availability of it by allowing customers to share and/or purchase pre-existing or pre-developed printer profile settings for their intended applications.

Namely, the present disclosure is intended to overcome the drawbacks of other methods by exploiting the benefits of searching a database and sharing one or more pre-developed printer profile settings. In particular, the present disclosure relates to a system and method for searching, purchasing and/or sharing one or more pre-existing or pre-developed printer profile settings.

SUMMARY

The present disclosure provides a system for operating one or more printers. The system includes: a first database for managing and storing first content within the system; a second database for managing and storing second content within the system; and at least one network connection for connecting the first database and the second database for allowing the first content and the second content to be shared between the first database and the second database; wherein at least one of the first content or the second content include at least one or more printer profiles.

The present disclosure also provides a method for exchanging one or more pre-developed printer profile settings. The method includes the steps of managing and storing first content via a first database located in a first printer system; managing and storing second content via a second database located in a second printer system; connecting the first database and the second database via at least one network connection; and allowing the first content and the second content to be shared between the first database and the second database; wherein at least one of the first content or the second content include at least one or more printer profiles.

The present disclosure also provides a computer-readable medium for storing a set of programmable instructions configured for execution by at least one processor for exchanging one or more pre-developed printer profile settings. The method includes the steps of: managing and storing first content via a first database located in a first printer system; managing and storing second content via a second database located in a second printer system; connecting the first database and the second database via at least one network connection; and allowing the first content and the second content to be shared between the first database and the second database; wherein at least one of the first content or the second content include at least one or more printer profiles.

The present disclosure also provides a system for operating and controlling one or more printers. The system includes: one or more databases for managing and storing one or more printer profiles; one or more transmitting terminals in operable communication with each of the one or more printers for transmitting the one or more printer profiles; one or more receiving terminals in operable communication with each of the one or more printers for receiving the one or more printer profiles; a determining section for determining the source and destination of the one or more printer profiles; a recording section for recording the source and destination of the one or more printer profiles; and a printer profile transfer control section for controlling the one or more transmitting terminals and the one or more receiving terminals of each of the one or more printers based on whether the one or more printer profiles are permitted to be transferred or received by the one or more printers based on authorization and authentication verifications.

The present disclosure also provides a method for operating and controlling one or more printers. The method including the steps of: managing and storing one or more printer profiles via one or more databases; transmitting the one or more printer profiles via one or more transmitting terminals in operable communication with each of the one or more printers; receiving the one or more printer profiles via one or more receiving terminals in operable communication with each of the one or more printers; determining the source and destination of the one or more printer profiles via a determining section; recording the source and destination of the one or more printer profiles via a recording section; and controlling the one or more transmitting terminals and the one or more receiving terminals of each of the one or more printers based on whether the one or more printer profiles are permitted to be transferred or received by the one or more printers based on authorization and authentication verifications via a printer profile transfer control section.

BRIEF DESCRIPTION OF THE DRAWINGS

Various embodiments of the present disclosure will be described herein below with reference to the figures wherein.

DETAILED DESCRIPTION

Figure 1:
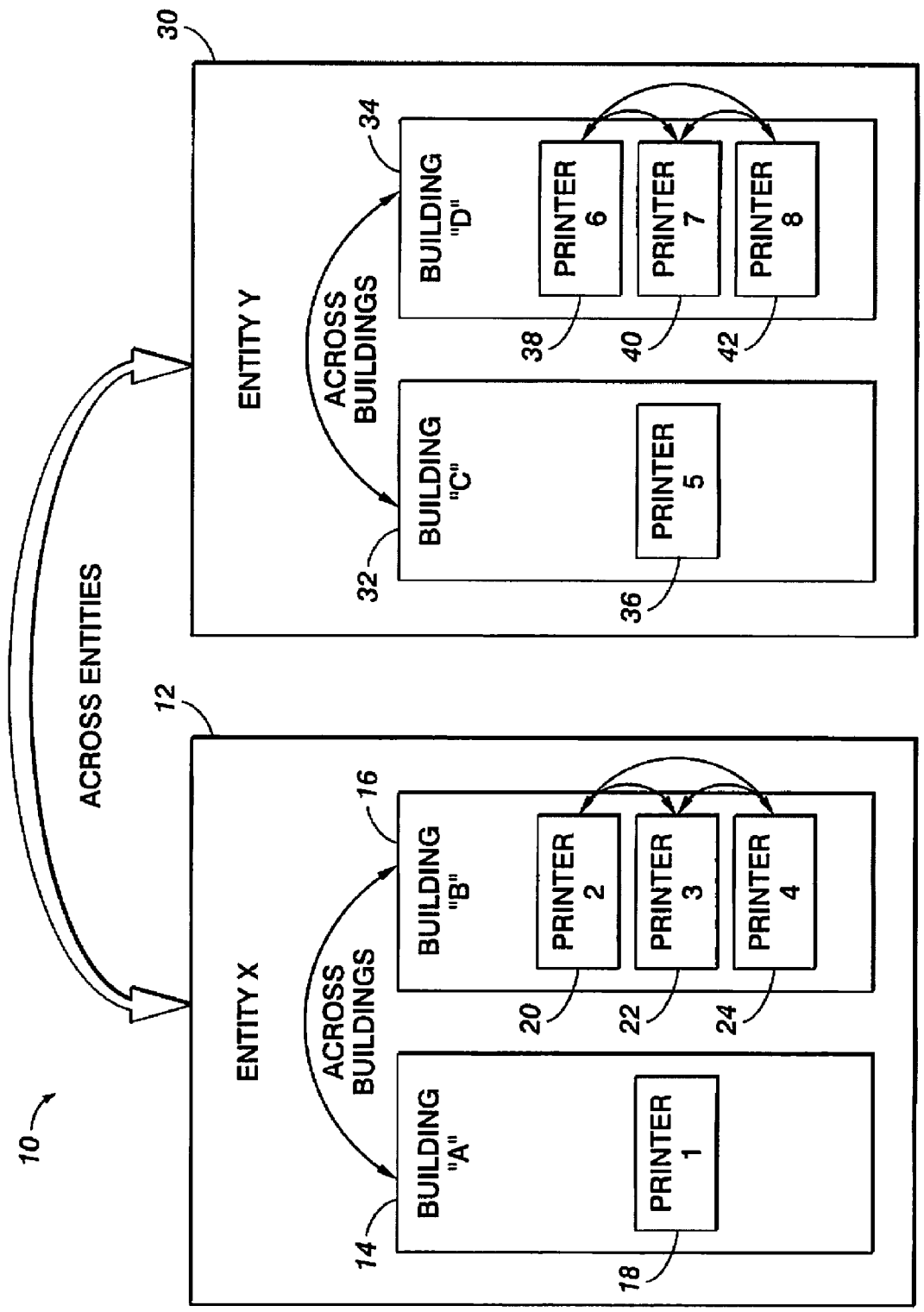
FIG. 1 is a block diagram depicting a system for purchasing and/or sharing one or more pre-developed printer profile settings, in accordance with the present disclosure.

The present disclosure proposes the creation of an interactive network/database that stores and shares data related to parameter set-points and/or algorithms. Furthermore, one or more pre-developed printer profile settings may be shared between machines, buildings, customers, etc. Setting printer profiles could be based on any and/or all of the following: media type, room temperature, roll age, developer age, improve life, improve quality, desired gloss output, altitude, etc. The present disclosure is not limited to sharing one type of pre-developed parameters of a printer profile, such as fuser set parameters. The present disclosure is expanded and broadened to include a plurality of subsystems that tune a plurality of parameters to desired job conditions. Such subsystems can include, for example, post-fuse processing subsystems related to laminating or binding processes. It is understood that any type of parameters of any type of system or subsystem related to printing methodologies and technologies can be adjusted or improved in accordance with the present disclosure.

Additionally, the present disclosure proposes an interactive network/database for storing and sharing one or more pre-developed printer profile settings similar to the manner in which music sharing systems and methods enable file sharing for audio and video files. For example, printer performance depends on customer usage patterns characterized by factors such as media type, image content, ambient temperature and humidity, altitude, component age, and image quality requirements. Developing desired printer profiles for all combinations of these factors that are likely to occur in a customer environment is an intractable issue for many customers. However, by providing an on-line resource for customers to search and exchange one or more pre-developed printer profiles for various operating conditions offers customers an opportunity to selectively adjust the variables of their systems based on the collective experience of other customers, similarly to music sharing methods and systems.

Embodiments will be described below while referencing the accompanying figures. The accompanying figures are merely examples and are not intended to limit the scope of the present disclosure.

Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

The term "printer profile" can refer to the print quality a printer is capable of printing. A printer profile is used to ensure that a file prints in an acceptable manner. A "profile" is a file that describes how a given printer/ink/paper combination combine to obtain print quality according to known or assumed customer desires or other parameters. Custom printer profiles are individually made files that calibrate a specific individual printer to one type of paper with one inkset at one specific set of printer driver settings. The "printer profile" parameters can include, but are not limited to: printer model, subsystem age, temperature, RH, elevation, media type, image content, desired output, etc.

The term "set point data" can refer to a set of data that is useful for calibrating one or more parameters of a subsystem. The "set point data" are data that may relate to specific operating requirements of a subsystem.

The term "database" can refer to a structured collection of records or data that is stored in any type of computing system. The term "database" as used herein encompasses a collection of information organized in such a way that a computer program can quickly select desired pieces of data. The database is not necessarily embedded in the CRUMs and may be a separate and distinct device in regard to the CRUMs and/or the pre-developed printer profiles.

Xerox's® Customer Replaceable Unit Monitor (CRUM) technology defines a process by which the state or status of consumable subsystems can be monitored to enhance the efficiency or productivity of the machine on which it is installed. The term "CRUM" is merely used as an example of a process for monitoring one or more machines or devices. It is understood that the present disclosure is compatible with any type of technology related to all machine subsystems which contain consumables. Additionally, the present disclosure is compatible with any type of machine or device that uses or does not use CRUM technology in any or all respects. Furthermore, the CRUM technology may or may not include one or more pre-developed or pre-existing printer profiles. The location of the printer profiles within a database can be determined by design limitations and/or customer preference.

With reference to FIG. 1, there is depicted a block diagram of a system for purchasing and/or sharing one or more pre-developed or pre-existing printer profile settings, in accordance with the present disclosure. The block diagram 10 includes a first entity 12 and a second entity 30. The term "entity" can refer to anything that may exist as a discrete and/or distinct unit that owns, operates, manages, and/or controls one or more of a plurality of machines. For example, the term "entity" may include the term "building," as used in reference to FIG. 1.

The first entity 12 includes a first building 14 and a second building 16. The first building 14 includes a first printer 18. The second building 16 includes a second printer 20, a third printer 22, and a fourth printer 24. As seen in the block diagram 10, the printers of the first building 14 are in operable communication with the printers of the second building 16. For instance, the first printer 18 can share its pre-developed or pre-existing printer profiles with the second printer 20, the third printer 22 or the fourth printer 24, or with all the printers (i.e., 20, 22, 24) in the second building 16, and vice versa. As a result, all the printers (i.e., 18, 20, 22, 24) within the first entity 12 can share or exchange one or more pre-developed or pre-existing printer profiles in a quick and efficient manner.

The second entity 30 includes a third building 32 and a fourth building 34. The third building 32 includes a fifth printer 36. The fourth building 34 includes a sixth printer 38, a seventh printer 40, and an eighth printer 42. As seen in the block diagram 10, the printers of the third building 32 are in operable communication with the printers of the fourth building 34. For instance, the fifth printer 36 can share its one or more pre-developed or pre-existing printer profiles with the sixth printer 38, the seventh printer 40 or the eighth printer 42, or with all the printers (i.e., 38, 40, 42) in the fourth building 34, and vice versa. As a result, all the printers (i.e., 36, 38, 40, 42) within the second entity 30 can share or exchange the one or more pre-developed or pre-existing printer profiles in a quick and efficient manner.

Additionally, the printers (i.e., 18, 20, 22, 24) located in the first entity 12 can communicate (share/exchange data) with the printers (i.e., 36, 38, 40, 42) located in the second entity 30. The first entity 12 and the second entity 30 may be located at a remote distance from each other. Therefore, according to the present disclosure, a plurality of entities may exchange one or more pre-developed or pre-existing printer profile data across one or more data networks. This enables entities to obtain "off-the-shelf" pre-developed printer profiles without expending energy in re-creating printer profiles that already exist.

Furthermore, the first database and the second database can be owned by the same entity as illustrated in FIG. 1. In other words, the first entity 12 can share and exchange the one or more pre-developed or pre-existing printer profiles only between the buildings the first entity 12 owns (i.e., 14 and 16). However, the first database and the second database can be owned by separate entities, as also illustrated in FIG. 1. In other words, the first entity 12 can share/exchange and sell or purchase the one or more pre-developed or pre-existing printer profiles with the second entity 30. For example, a pre-developed or pre-existing printer profile located in the third printer 22 of the second building 16 of the first entity 12 can be sold or purchased by the second entity 30 and deposited in the eighth printer 42 of the fourth building 34. The second entity 30 can be located at a remote location with reference to the first entity 12.

Figure 2:
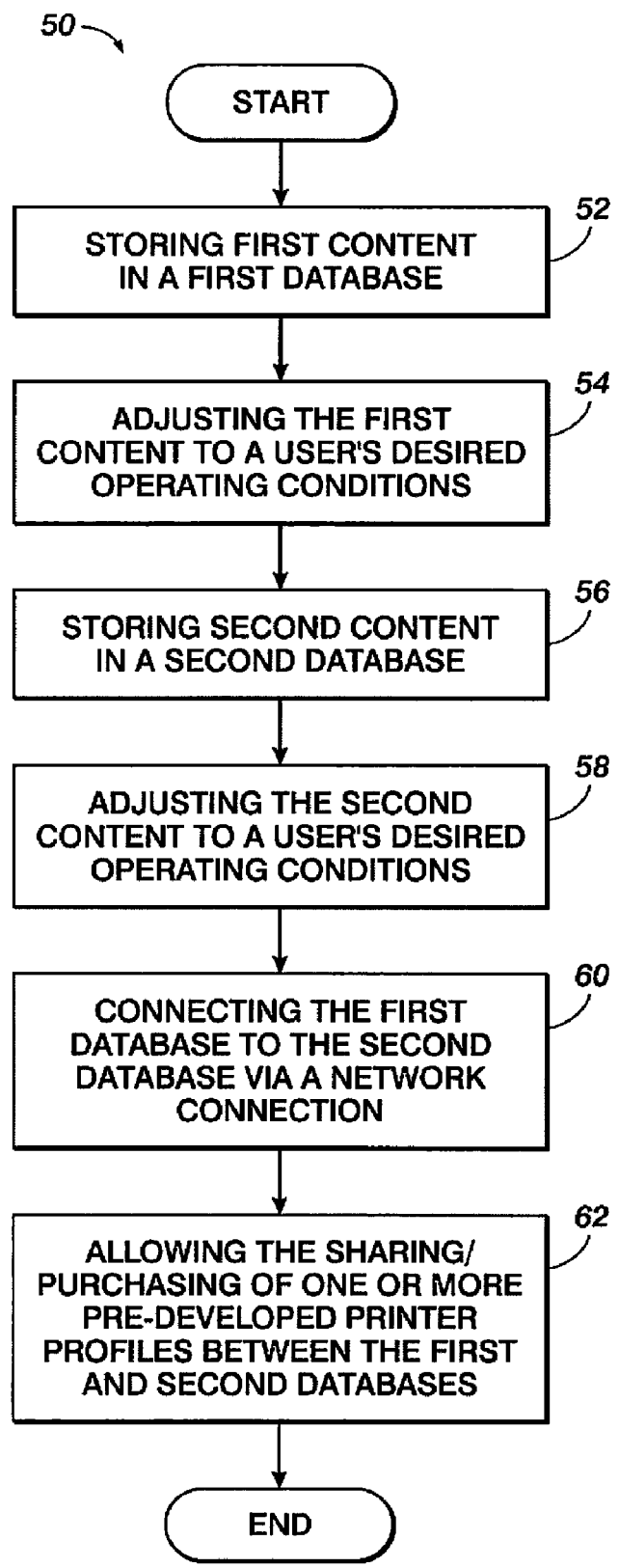
FIG. 2 is a method for purchasing and/or sharing one or more pre-developed printer profile settings as shown by FIG. 1, in accordance with the present disclosure.

With reference to FIG. 2, there is a flowchart describing a method for purchasing and/or sharing one or more pre-developed or pre-existing printer profile settings as shown by FIG. 1, in accordance with the present disclosure. The flow chart 50 simply describes a method for purchasing and/or sharing one or more pre-developed or pre-existing printer profile settings. In step 52, first content is stored in a first database. In step 54, the first content is selectively adjusted to a user's desired operating conditions. In step 56, second content is stored in a second database. In step 58, the second content is selectively adjusted to a user's desired operating conditions. In step 60, the first database and the second database are connected via a network connection. In step 62, the network connection allows the sharing and/or purchasing of one or more pre-developed or pre-existing printer profiles between the first and the second databases.

In addition, each database that includes a pre-developed or pre-existing printer profile has a search function to provide customers with searching capabilities. In other words, a user located in the first entity 12 may require a specific pre-developed or pre-existing printer profile for his printer. However, the first entity 12 may be comprised of several buildings spread across a vast geographical area. The user may not be able to physically investigate every building to locate the appropriate pre-developed or pre-existing printer profile. However, the user may access any pre-developed or pre-existing printer profile by accessing any printer of the first entity 12 in any location. Once the user accesses the most convenient printer, the user may search all the pre-developed or pre-existing printer profiles of every printer of the first entity 12 and request the desired pre-developed or pre-existing printer profile. Moreover, if a first database of a first entity 12 is operable connected (e.g., via Internet) to a second database of a second entity 30, then a user located/employed for the first entity 12 may access and purchase one or more pre-developed or pre-existing printer profiles located at printers owned by the second entity 30, and vice versa.

Accordingly, the present disclosure allows for the purchasing and/or sharing of one or more pre-developed or pre-existing printer profile settings between entities, thus minimizing or even eliminating downtime due to re-creating desired printer profile settings. Aspects illustrated herein also allow entities to target one or more specific entities that have developed one or more pre-existing printer profiles for their products and be capable of purchasing such pre-developed or pre-existing printer profiles directly from the developer.

Furthermore, the present disclosure also encompasses independent service organizations (ISOs). Such ISOs are capable of maintaining or accessing or controlling databases without being the end-users of the products (e.g., the printer profiles). However, such ISOs should not be permitted to facilitate the transfer of printer profiles without proper authentication and authorization. Authentication is the process by which a computer, computer program, or user attempts to confirm that the computer, computer program, or user from whom the second party has received some communication is, or is not, the claimed first party. Authorization (or establishment) defines a user's rights and permissions on a system. After a user (or process) is authenticated, authorization determines what that user can do on the system. The present disclosure requires authentication and authorization of every user who attempts to access a printer having one or more printer profiles in order to ensure proper verification and to reduce or eliminate the pirating of printer profiles. In addition, the present disclosure allows for the recordation of the source and destination of the printer profiles.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system configured to store and share printer profiles, the system comprising:
   a first database maintained in a non-transitory computer-readable medium, wherein the first database is configured to:
   store and manage one or more printer profiles;
   connect to a second database via a network connection, wherein the second database is configured to manage and store one or more printer profiles;
   share one or more printer profiles with the second database using the network connection; and
   search one or more printer profiles stored on the first database or the second database in response to a user request.

2. The system according to claim 1, wherein one or more printer profiles stored in the first database or the second database include one or more of the following data: media type data, image content data, ambient temperature data, humidity data, component age data, and image quality data.

3. The system according to claim 1, wherein one or more printer profiles stored in the first database or the second database include predetermined fuser set parameters.

4. The system according to claim 1, wherein one or more printer profiles stored in the first database or the second database include predetermined xerographic set parameters.

5. The system according to claim 1, wherein one or more printer profiles stored in the first database or the second database include predetermined algorithms.

6. The system according to claim 1, wherein one or more printer profiles stored in the first database or the second database are purchased by owners of the first database or the second database.

7. The system according to claim 1, wherein the first database and the second database are owned by different entities.

8. The system according to claim 1, wherein the first database is located in a remote location in reference to the second database.

9. A method for storing and sharing printer profiles, the method comprising the steps of:
   managing and storing one or more printer profiles within a first database, wherein the first database is maintained in a non-transitory computer-readable medium;
   connecting the first database to a second database via a network connection, wherein the second database is configured to manage and store one or more printer profiles;
   sharing one or more printer profiles between the first database and the second database using the network connection; and
   searching one or more printer profiles stored in the first database or the second database in response to a user request.

10. The method according to claim 9, wherein one or more printer profiles stored in the first database or the second database include one or more of the following data: media type data, image content data, ambient temperature data, humidity data, component age data, and image quality data.

11. The method according to claim 9, wherein one or more printer profiles stored in the first database or the second database include predetermined fuser set parameters.

12. The method according to claim 9, wherein one or more printer profiles stored in the first database or the second database include predetermined xerographic set parameters.

13. The method according to claim 9, wherein one or more printer profiles stored in the first database or the second database include predetermined algorithms.

14. The method according to claim 9, wherein one or more printer profiles stored in the first database or the second database are purchased by owners of the first database or the second database.

15. The method according to claim 9, wherein the first database and the second database are owned by different entities.

16. The method according to claim 9, wherein the first database is located in a remote location in reference to the second database.

17. A non-transitory computer-readable medium storing a set of programmable instructions configured for execution by at least one processor for storing and sharing printer profiles, the instructions comprising the steps of:
   managing and storing one or more printer profiles within a first database, wherein the first data base is maintained in a non-transitory computer readable medium;
   connecting the first database to a second database via a network connection, wherein the second database is configured to manage and store one or more printer profiles;
   sharing one or more printer profiles between the first database and the second database using the network connection; and
   searching one or more printer profiles stored on the first database or the second database in response to a user request.

18. The computer-readable medium according to claim 17, wherein one or more printer profiles stored in the first database or the second database are purchased by owners of the first database or the second database.

19. A system for operating and controlling one or more printers, the system comprising:
   one or more databases for managing and storing one or more printer profiles;
   one or more transmitting terminals in operable communication with each of the one or more printers for transmitting the one or more printer profiles;

one or more receiving terminals in operable communication with each of the one or more printers for receiving the one or more printer profiles;

a determining section for determining the source and destination of the one or more printer profiles;

a recording section for recording the source and destination of the one or more printer profiles; and a printer profile transfer control section for controlling the one or more transmitting terminals and the one or more receiving terminals of each of the one or more printers based on whether the one or more printer profiles are permitted to be transferred or received by the one or more printers based on authorization and authentication verifications.

20. A method for operating and controlling one or more printers, the method comprising the steps of:

managing and storing one or more printer profiles via one or more databases;

transmitting the one or more printer profiles via one or more transmitting terminals in operable communication with each of the one or more printers;

receiving the one or more printer profiles via one or more receiving terminals in operable communication with each of the one or more printers;

determining the source and destination of the one or more printer profiles via a determining section;

recording the source and destination of the one or more printer profiles via a recording section; and controlling the one or more transmitting terminals and the one or more receiving terminals of each of the one or more printers based on whether the one or more printer profiles are permitted to be transferred or received by the one or more printers based on authorization and authentication verifications via a printer profile transfer control section.

* * * * *